United States Patent [19]
Rao et al.

[11] Patent Number: 5,348,817
[45] Date of Patent: Sep. 20, 1994

[54] BIPOLAR LEAD-ACID BATTERY

[75] Inventors: Purushothama Rao; Jing-Yih Cherng, both of Eagan, Minn.

[73] Assignee: GNB Battery Technologies Inc., Mendota Heights, Minn.

[21] Appl. No.: 72,414

[22] Filed: Jun. 2, 1993

[51] Int. Cl.$^5$ ............................................. H01M 10/18
[52] U.S. Cl. ...................................... 429/210; 429/245
[58] Field of Search ............... 429/210, 204, 225, 245, 429/233

[56] References Cited

U.S. PATENT DOCUMENTS

| | | |
|---|---|---|
| 3,728,158 | 4/1973 | Poe et al. |
| 4,125,680 | 11/1978 | Shropshire et al. |
| 4,429,442 | 2/1984 | Thomas |
| 4,542,082 | 9/1985 | Rowlette |
| 4,637,970 | 1/1987 | Yeh et al. |
| 4,683,648 | 8/1987 | Yet et al. |
| 4,873,161 | 10/1989 | Rippel et al. |
| 4,964,878 | 10/1990 | Morris |
| 5,068,160 | 11/1991 | Clough et al. |
| 5,098,801 | 3/1992 | Boram et al. |
| 5,106,708 | 4/1992 | Bish et al. |
| 5,106,709 | 4/1992 | Tekkanat et al. |
| 5,288,566 | 2/1994 | Ginatta et al. ............ 429/210 |

OTHER PUBLICATIONS

Clifford, "Study of Bipolar Batteries" (1984).
Arias et al., "Sealed Bipolar Lead-Acid Batteries for High-Power Battery Applications," 8th Annual Battery Conference on Applications and Advances (1993).
Rowlette, "Development Status of the ARA Sealed Bipolar Lead-Acid Battery," 8th Annual Battery Conference on Applications and Advances (1993).

*Primary Examiner*—Anthony Skapars
*Attorney, Agent, or Firm*—Leydig, Voit & Mayer

[57] ABSTRACT

A bipolar lead-acid is disclosed in which a conductive metal substrate is used for the bipolar plates which may comprise either a multi-layer metallic substrate defined as C/A/B/D, layer C having a layer of positive active material adhered thereto and layer D having a layer of negative active material adhered thereto, C can be lead or lead alloy or a conductive tin, titanium dioxide or ruthenium oxide, A is titanium or tin, B is copper or tin, and D is lead, a lead alloy or tin, or a conductive metal substrate-fiber or mesh composite in which the fiber may be glass fibers or the like. A preferred embodiment provides a bipolar lead-acid battery having enhanced capacity by utilizing a central bi-negative or bi-positive plate so that the capacity can be increased without increasing the size of the plates.

13 Claims, 4 Drawing Sheets

BIPOLAR LEAD-ACID BATTERY

RELATED APPLICATIONS

Rao, Ser. No. 07/852,803, filed Mar. 17, 1992, now U.S. Pat. No. 5,298,350 for "Calcium-Tin-Lead-Silver Lead-Based Alloys and Battery Grids and Lead-Acid Batteries Made Using Such Alloys," assigned to the assignee of the present invention.

Kump et al., Ser. No. 08/071,298, filed on even date herewith, for "Method of Assembling A Bipolar Lead-Acid Battery and the Resulting Bipolar Battery," assigned to the assignee of the present invention.

BACKGROUND OF THE INVENTION

1. Field of the Invention

This invention relates to lead-acid batteries and, more particularly, to a bipolar lead-acid battery.

2. Description of the Prior Art

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery applications").

The lead-acid electrochemical system has provided a reliable energy source, and the resulting batteries are amenable to automated production with a high quality standard. However, one serious drawback of either the flooded or sealed, absorbed electrolyte lead-acid batteries is their relatively low energy and power density. It has long been a desire to provide an energy source with the reliability of a flooded or sealed lead-acid battery system while at the same time achieving much higher energy and power densities.

Thus, as one example, a true bipolar battery (i.e., the positive and negative plates in some fashion share the same conductive grid or substrate) is capable of providing energy performances at 20 hour rates of about 35–65 watt-hours/kg. and 90–160 watt-hours/liter in comparison to 35–47 watt-hours/kg. and about 50–66 watt-hours/liter for what has been termed a quasi-bipolar battery (i.e., while not sharing the same grid or substrate, the positive and negative plates are connected by multiple connections such as shown in U.S. Pat. No. 4,209,575 to McDowall et al.). As regards the power density capability, a true bipolar battery should be capable providing about 1.3 to 6.0 kilowatts/kg. and 3.2 to 14 kilowatts/liter in comparison to about 0.9 kilowatts/kg. and 1.2 kilowatts/liter for a quasi-bipolar battery. The comparative difference in the power and energy density capabilities between a true bipolar and a conventional lead-acid battery design will be even more dramatic. In addition, the inherent uniform current distribution characteristic of a bipolar lead-acid battery in comparison to that exhibited by a conventional lead-acid battery should result in an overall increase in the active material utilization and battery cycle life.

For these reasons, considerable effort over the last 20 years has been directed to developing lead-acid and other electrochemical systems in a bipolar design. U.S. Pat. No. 3,728,158 to Poe et al. discloses a low silhouette, bipolar electrode battery stack in which several cells are individually vented along the side of the battery to a venting manifold. U.S. Pat. No. 4,125,680 to Shropshire et al. discloses a plurality of bipolar carbon-plastic electrode structures that are formed by first molding thin conductive carbon-plastic sheets from heated mixtures of specified carbon and plastic and then establishing frames of dielectric plastic material around the sheets and sealing the frames to the sheets so as to render the resulting structures liquid impermeable.

U.S. Pat. No. 4,964,878 to Morris discloses a method of making a recombinant lead-acid battery which comprises assembling stacks of plates in such a manner that a positive plate in a particular position in one stack is connected to a negative plate in the same relative position in an adjacent stack by a common substrate of the positive and negative plates. U.S. Pat. No. 5,068,160 to Clough et al. discloses an assembly of plates, spacer members and thermoplastic polymer frame elements which are bonded together.

Still further, U.S. Pat. No. 4,542,082 to Rowlette discloses a variety of approaches for providing bipolar plates, More particularly, it is noted that most batteries utilizing bipolar plates have utilized metal substrates such as lead or lead alloys. After setting forth the problems with such an approach, Rowlette states that a different approach must be used if acceptable battery weight and service life are to be simultaneously achieved. Alternative approaches, Rowlette identifies, have included plates formed by dispersing conductive particles or filaments such as carbon, graphite, or metal in a resin binder such as polystyrene incorporating therein metal or graphite powder (U.S. Pat. No. 3,202,545), a plastic frame of polyvinylchloride with openings carrying a battery active paste mixed with nonconductive fibers and short non-contacting lead fibers for strengthening the substrate (U.S. Pat. No. 3,466,193), a bi-plate having a layer of zinc and a polyisobutylene mixed with acetylene black and graphite particles for conductivity of the plate (U.S. Pat. No. 3,565,694), a substrate for a bipolar plate including polymeric material and vermicular expanded graphite (U.S. Pat. No. 3,573,122), a rigid polymer frame having a grid entirely of lead filled with battery paste (U.S. Pat. No. 3,738,871), a plastic thin substrate having lead stripes on opposite faces, the lead stripes being interconnected through an opening in the substrate and retained by plastic retention strips (U.S. Pat. No. 3,891,412), and a bi-plate having a substrate of thermoplastic material filled with finely divided vitreous carbon and a layer of lead antimony foil bonded to the substrate for adhering active materials (U. S. 4,098,967).

Rowlette further references U.S. Pat. No. 4,275,130 in which the bipolar plate construction comprises a thin composite of randomly oriented conductive graphite, carbon or metal fibers embedded in a resin matrix with stripes of lead plated surfaces thereof. Still further reference is made to Rowlette's then-pending application which includes a bi-plate formed of a thin sheet of titanium covered with a layer of epoxy resin containing graphite powder.

In the '082 Rowlette patent, the bipolar plate is described as being formed of a continuous sheet of a resinous material containing a plurality of spaced conductors extending from a first surface to the second surface thereof. The conductors are sealingly received in the sheet of resin in such a fashion that no liquid passes between the resin enveloping the end of the conductor facing each surface thereof.

Still further examples of bipolar electrochemical plates are set forth in U.S. Pat. Nos. 4,637,970 and 4,683,648 to Yeh et al. The bipolar electrodes described comprise a core portion composed of titanium and an integral, substantially continuous and non-porous layer of lead electroplated onto at least one surface of the core portion and diffused a selected distance into the core portion.

Yet, despite the substantial advantages that could be achieved using bipolar batteries and cells and the substantial amount of work and attention directed to this type of battery over at least the last 20 years, it seems that bipolar lead-acid batteries have remained largely a very promising laboratory curiosity. At least the vast majority of the applications where a bipolar lead-acid battery would be most advantageous (e.g., SLI, electric vehicle and hybrid electric vehicle) require capacities that cannot be readily obtained because of the size of the plates that would be required. It is thus quite difficult to provide a bipolar design that will have the desired capacity but will also meet the limited space requirements. Providing a conductive metal substrate that can satisfy the strength and corrosion resistance requirements has also been, it seems, an insurmountable problem. Achieving satisfactory paste adhesion and venting have also proven to be difficult tasks. Reliable electrolyte-free sealing means between adjacent bi-plates and cells has proved to be difficult in the past and has been one of the problems. Thus, there still exists the need for a bipolar battery which will achieve the enhanced electrochemical performance that a bipolar battery design can provide while satisfactorily dealing with the diverse problems identified by the prior art in a reliable manner.

It is accordingly a principal object of the present invention to provide a reliable but practical bipolar lead-acid battery.

Another object of the present invention is to provide a bipolar battery modular in design which allows the ease of increase in capacity without the necessity of increasing the size of the plates.

A further object of this invention lies in the provision of a bipolar battery characterized by high active material utilization and improved cycle life.

A still further object provides a bipolar battery employing a conductive metal substrate.

Another object of the present invention lies in the provision of a bipolar battery having enhanced paste adhesion characteristics.

Yet another object provides a bipolar battery having desirable venting capabilities.

These and other objects and advantages of the present invention will be apparent from the following description and drawings.

SUMMARY OF THE INVENTION

Pursuant to one aspect of the present invention, a bipolar lead-acid battery is provided having enhanced capacity by utilizing a central bi-negative or bi-positive plate. In this fashion, the capacity can be increased without increasing the size of the plates.

Another aspect of this invention involves the use of novel conductive metal substrates for the bipolar battery. Such novel substrates possess the requisite strength and stiffness, while providing the corrosion resistance necessary for an adequately long cycle and service life.

A further aspect comprises the use of multiple layers of positive active material. Such use allows optimizing the performance for a specific application.

Yet another aspect of this invention achieves a bipolar battery having enhanced paste adhesion characteristics. Such enhancement is obtained by suitable treatment of the substrate.

DETAILED DESCRIPTION OF THE INVENTION

Figure 1:
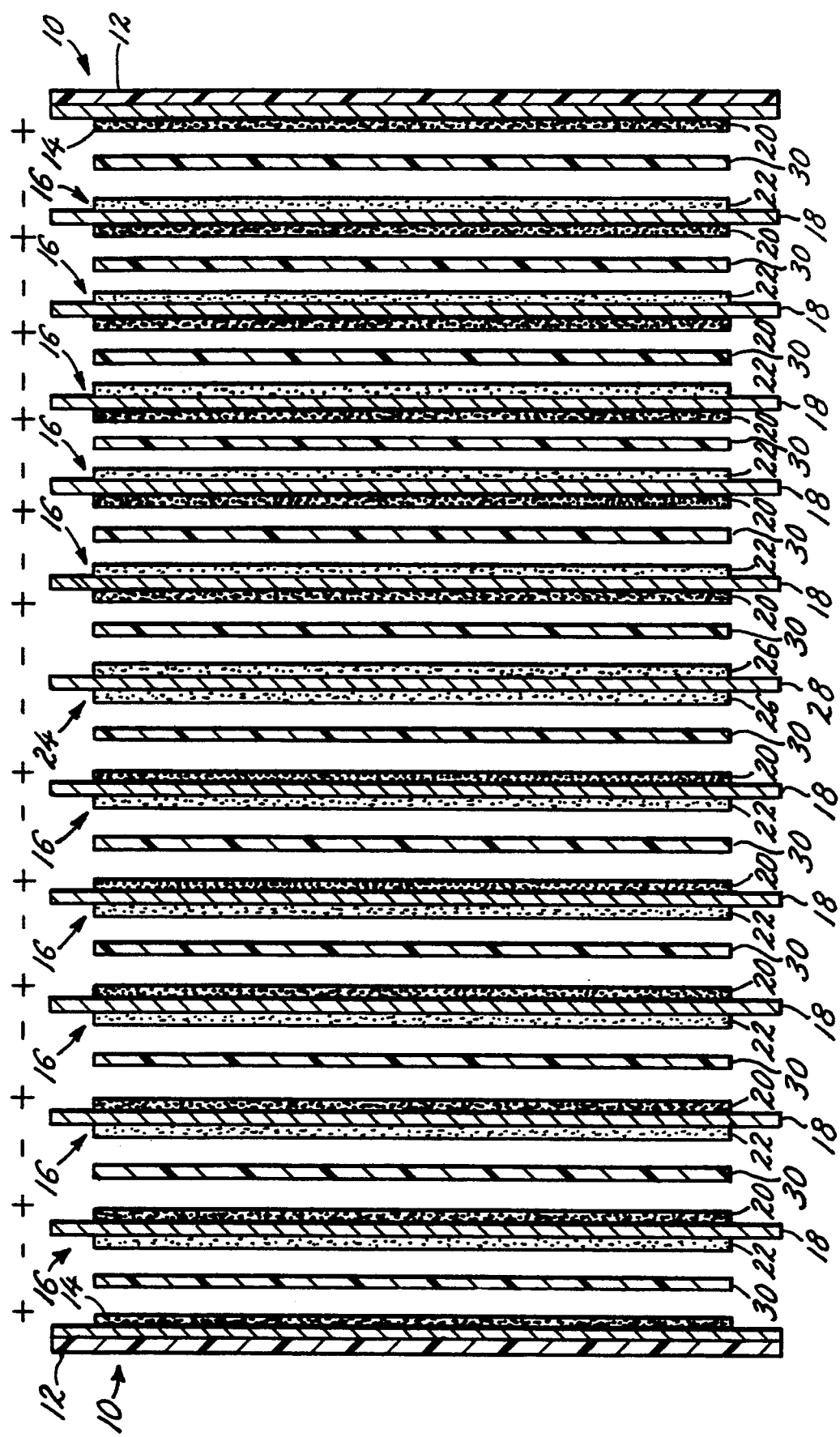
FIG. 1 is a schematic view of one embodiment of a bipolar lead-acid battery in accordance with the present invention.

FIG. 1 is a schematic view of one embodiment of a bipolar battery in accordance with one principal aspect of the present invention in which a central bi-negative plate is utilized to double the capacity (two 12-volt batteries in parallel being provided) without requiring the size of the individual plates to be increased. In this embodiment, the bipolar battery is assembled using unipolar end plates having an active material layer of the same polarity, a series of bipolar plates with one side having a positive active material layer and the other side a negative active material layer, and a central bi-plate having a layer of active material on each side opposite in polarity to that of the end plate positioned between the bipolar plates, thereby providing two side-by-side bipolar batteries to be electrically connected in parallel.

Thus, as illustrated in FIG. 1, each end plate 10 comprises a conductive metal substrate 12 and a layer of positive active material 14 adhered thereto. Enough bipolar plates are then provided to achieve, with the size of plates desired, the necessary capacity and voltage for the particular application. As shown in FIG. 1, 10 bipolar plates 16 are included.

Each bipolar plate 16 comprises a conductive metal substrate 18 having a layer of positive active material 20 and a layer of negative active material 22 adhered to opposite sides of the conductive metal substrate 18. Since the end plates 10 in the illustrative embodiment have a layer 14 of positive active material, the bipolar plate negative active material layer 22 is positioned so as to face end plate positive active material layer 14.

Separating the illustrative bipolar battery into effectively two side-by-side batteries electrically connected in parallel to double the capacity is central bi-plate 24, having a negative active material layer 26 on each side of a conductive metal substrate 28 since the end plates have a layer of positive active material.

Positioned between each pair of adjacent plates is a separator 30. The bipolar batteries of the present invention can be either of a conventional flooded lead-acid battery or of a recombinant, valve-regulated, sealed lead-acid battery design; and, as is known, the type of separator utilized will vary with the design of the battery. Many suitable separator materials are known for these types of batteries and may be utilized in the bipolar battery of the present invention. When a recombinant or valve-regulated, sealed battery is desired, exemplary separators range from a glass mat of microfine fibers to a mat of synthetic fibers and to mats of a combination of both glass and synthetic fibers. The thickness of the separators employed for sealed, recombinant bipolar batteries will depend upon the amount of electrolyte to be absorbed to achieve the capacity desired, as is known.

Figure 2:
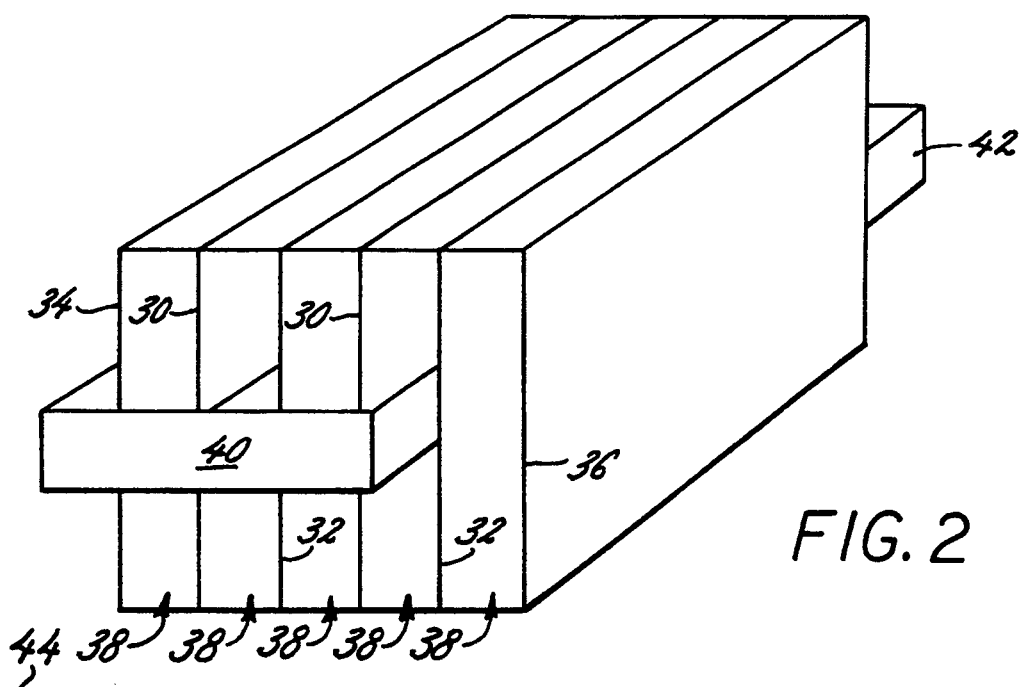
FIG. 2 is a schematic view of another embodiment of this invention and illustrating a design configured to achieve substantial increase in capacity while requiring a minimum volume.

The present invention provides a versatile and flexible approach by which end plates with either or both central bi-plates and bipolar plates of opposite polarity between central and end plates may be assembled into a configuration that achieves the performance characteristics desired. One highly efficient configuration is illustrated in FIG. 2 in which two alternately positioned central bi-negative plates 30 and two central bi-positive plates 32 have positive end plate 34 adjacent one of the central bi-negative plates 30 and negative end plate 36 adjacent one of the central bi-positive plates 32. Positioned between any adjacent set of end and central plates and between adjacent sets of center plates, as shown generally at 38, are five bipolar plates, each bipolar plate being as described in connection with FIG. 1. By electrically connecting the configuration with a positive bus bar 40 and a negative bus bar 42, a 12-volt bipolar battery is provided in which the capacity has been effectively increased 500% without requiring any increase in the size of the plates.

The extreme versatility of this invention by which the requisite capacity and voltage desired may be achieved by the appropriate selection and location of the end, bipolar and central bi-plates also allows use of highly desirable conductive metal substrates for the respective plates. The conductive metal substrates must thus satisfy a wide variety of characteristics, including the strength and rigidity to allow not only the desired size of plate to be made (e.g., up to 60–66 in.$^2$ or so), as well as the capability to undergo the necessary assembly operations under high rates of production conditions. Further, the conductive metal substrate must offer adequate corrosion resistance characteristics for the service life required and must achieve adequate active material paste adhering characteristics.

Accordingly, pursuant to one aspect of the present invention, the conductive metal substrate utilized for the bipolar plate comprises a multi-layered metallic substrate. To this end, the multi-layered metallic substrate is C/A/B/D, configured so that the C/A side of the substrate is on the positive active material side while side B/D is on the negative side. Suitable multi-layered metallic substrates can be made by cladding or by electroplating, as is known. The outer layer D can be pure lead, pure tin, or, if desired, any lead alloy compatible in lead-acid batteries. Adequate strength and rigidity for a pure lead layer are achieved due to the presence of the other metal layers, so that use of a lead alloy, while useful, should generally be unnecessary. The outer layer C can be pure lead, a lead alloy or a conductive tin, titanium or ruthenium oxide layer, preferably a film (e.g., doped with Sb or F). Suitable illustrative examples of such oxides include $SnO_2$, $TiO_2$ and the various ruthenium oxides, i.e., $RuO$, $Ru_2O_3$, $Ru_3O_4$ and $Ru_3O_7$. These are nominal compositions prior to doping. As may be appreciated, when Sb is used as the dopant, an atom of Sb replaces an atom of Sn, Ti or Ru. When F is used as the dopant, an atom of F replaces an oxygen atom. The level of dopant employed to provide conductivity is known. The thickness of the Pb layer (or other layer C) on the positive side will be dictated by the service life required, viz., a thickness of about 0.0015 to 0.003 inch per year of service life may be needed. Layer A can be titanium or tin. In addition to enhancing the strength and rigidity of the substrate, the principal function of layer A is to protect against non-uniform corrosion on the positive active material side. Unnecessary if service life results in essentially uniform corrosion on the Pb layer positioned on the positive side, layer A provides highly desirable redundancy to minimize the effects of non-uniform corrosion that results in pinholes and the like through the Pb layer that will unduly decrease the service life. Metal layer B may comprise copper or tin; and, when layer D is also tin, layer B may be omitted. In addition to providing strength and rigidity, metal layer B, when titanium is utilized for metal layer A, protects the titanium against attack by hydrogen, as during charging. It also may be desirable to incorporate a layer of Sn between, when used, Pb/Ti and Pb/Cu to enhance the bonding between the respective metal layers.

For the central bi-negative plate and a negative end plate, corrosion resistance is not of much concern. The principal requirements are those other requirements previously identified. Accordingly, lead or a lead alloy may be employed for such substrates, with or without a layer of copper or tin for rigidity, strength, and the like.

As regards a central bi-positive and positive end plate, the conductive metal substrate can comprise any of those identified for the positive side of the bipolar plate.

Pursuant to yet another aspect of the present invention, a conductive metal substrate having desirable mechanical strength characteristics and enhanced paste adhesion is achieved by utilizing a lead or lead alloy fiber or mesh composite. According to one aspect, the positive side can comprise a glass fiber mat at least partially embedded in the desired pure lead or lead alloy utilized. Glass fibers can be thus partially embedded on only one or on both sides of the composite. It is preferred to paste positive paste on the substrate surface that has the glass fibers embedded. The glass fiber mat will provide the requisite strength and rigidity in combination with the lead or lead alloy substrate, and the non-embedded part of the mat will enhance bonding upon pasting of the active material. The microfine glass fibers utilized in making separators for valve-regulated, sealed lead-acid batteries is an illustrative example of a suitable glass fiber mat. Alternatively, titanium fibers or tin dioxide-coated glass fibers could be used.

For the negative side, when a lead-fiber or mesh composite is employed, any of the prior described conductive metal substrates could be used. It is also desirable to utilize a lead or lead alloy composite with fibers partially embedded in the lead or lead alloy so as to provide a surface that will enhance active material paste adhesion. Utilizing carbon fibers is an illustrative example. Indeed, the use of fibers that will add somewhat to conductivity, such as carbon fibers, is highly desirable.

Each of the lead-fiber composites can be made by known techniques. In general, the molten lead or lead alloy is forced to penetrate into the fiber layer, and the solidification of the lead will then provide the bonding strength between the lead and the fibers. Thereafter, a separate positive conductive metal substrate and a negative metal substrate can be formed into a composite substrate, such as for a bipolar plate, by rolling the two separate substrates together using conventional techniques.

Still other desirable conductive metal substrates in accordance with the present invention comprise a lead or lead alloy in which there is embedded a titanium or copper expanded mesh. This composite material may again be made by known techniques.

When using a conductive metal substrate which does not employ the multi-layered metallic configuration previously described herein, it may be desirable to use as the lead alloy any of the known alloys having enhanced corrosion resistance. Suitable alloys of this type are described in Rao, U.S. Ser. No. 07/852,803, filed Mar. 17, 1992, now U.S. Pat. No. 5,298,350 assigned to the assignee of the present invention.

By utilizing the conductive metal substrates of the present invention, the respective end plates, bipolar plates and central plates may be made having sizes up to 60 to 90 in.$^2$ or so. Yet, such plates will possess the requisite characteristics to satisfy demanding service life and other requirements.

Figure 3:
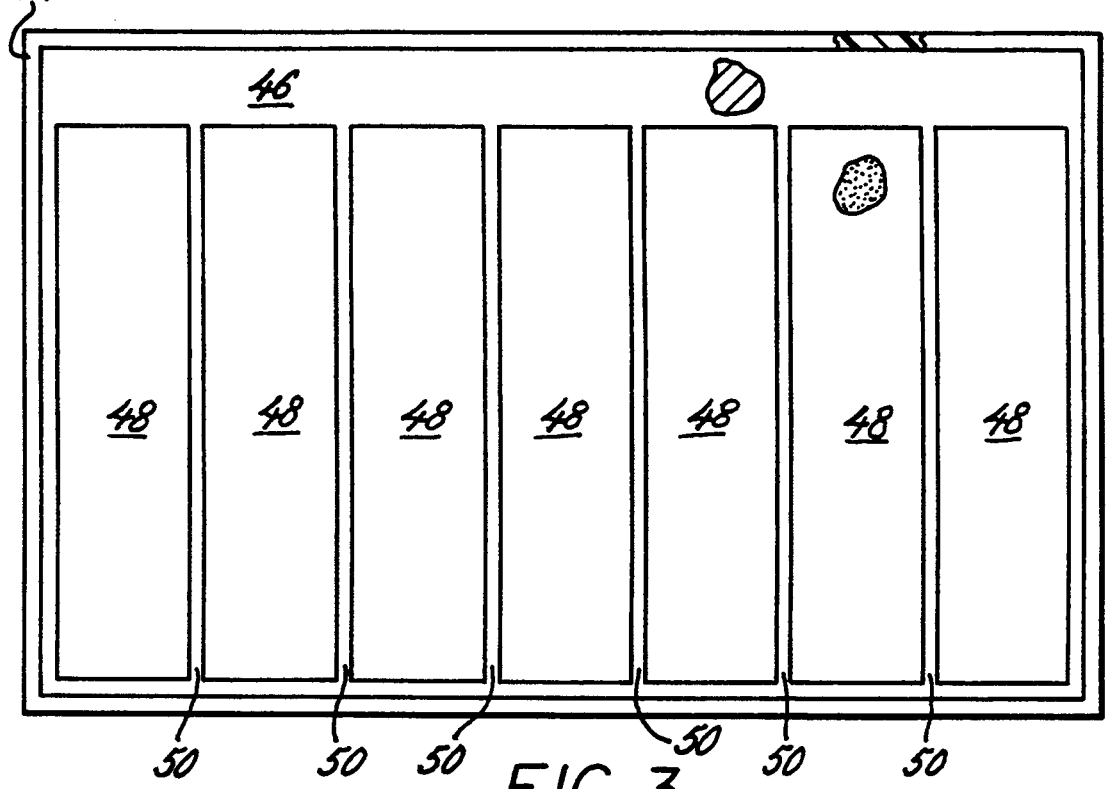
FIG. 3 is a diagrammatic view of a bipolar plate according to one embodiment of the present invention.

Pursuant to yet another and more specific aspect of the present invention, the battery plates utilized incorporate gas channels and include a plastic frame. To this end, as is shown in FIG. 3, one preferred embodiment of a plate employed in this invention comprises a plastic frame 44, a conductive metallic substrate 46 embedded in the frame and an active material layer 48. The active material layer 48 is discontinuous, providing gas channels 50 for venting. The utilization of a plastic frame having the periphery of the plate embedded therein achieves a modular component that will facilitate assembly. Techniques for making such modular components are known and may be used. It is preferred to utilize the assembly method for making the plates and for assembling the bipolar battery as described in the copending Kump et al. application identified herein and assigned to the assignee of the present invention.

In general, the active material positive and negative pastes can comprise any of the many which are known and have been used for conventional lead-acid batteries. For example, positive paste densities in the range of 3 to 4.5 gms./cm.$^3$ and in the range of 3.5 to 5.0 gms./cm.$^3$ for the negative are useful. Indeed, the paste densities that may be used in the bipolar battery of this invention are those known and used in conventional flooded and valve-regulated lead-acid batteries.

Figure 4:
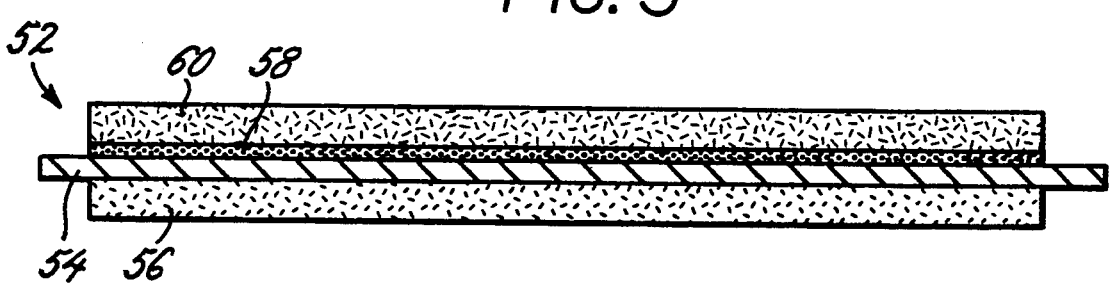
FIG. 4 is a diagrammatic view of a preferred plate for a bipolar battery having multiple layers of positive paste.

However, pursuant to a preferred aspect of the present invention, two or more layers of active material paste are utilized for the positive active materials so as to optimize the performance for a particular application. To this end, and as is shown in FIG. 4, the bipolar plate 52 comprises a conductive metal substrate 54, a layer of negative active paste 56, a high density paste layer 58 of positive active material and a low density active material layer 60 adhered to the high density layer 58 and to the conductive metal substrate 54.

The top positive paste layer 60 will be typically thicker than the inner layer and will have a low density so as to increase the material utilization. The interior or bottom positive paste layer 58 will typically be thinner than the outer layer and have a higher density so as to stabilize the interfacial contact between the conductive metal substrate 54 and the active material paste. In this fashion, both a high active material utilization and a good cycle life can be optimized by adjusting the paste density and the thickness of the respective layers. As an illustrative example, the low density paste layer 60 can have a density in the range of 3.5 to 4.0 gms./cm.$^3$ and a thickness of about 0.1 inch, while the inner paste layer 58 of high density can have a density in the range of from about 4.3 to 4.5 gms./cm.$^3$ and a thickness of about 0.02 inch.

A further aspect of this invention involves a preferred curing procedure. It is thus preferred, after pasting the respective plates with the active material, to store the pasted plates at room temperature, covered with a plastic film or the like for a time period sufficient to induce the development of a corrosion layer on the lead substrate surface. Thereafter, the plates are cured at an elevated temperature over an extended period of time up to about one day or so and are thereafter steam-cured at a temperature in excess of 200° F. for up to about one hour or so. The resulting plates can then be dried under ambient temperatures. The curing processes finally will result in a tetrabasic lead sulfate morphology in the positive paste.

The sulfuric acid electrolyte employed can have the specific gravities desired for the particular application, whether that application is a flooded bipolar battery or a valve-regulated sealed bipolar battery. Formation techniques are known and may be utilized as desired. Suitable venting in the assembled battery can be provided where a valve-regulated battery is desired by using, for example, bunsen valves and the like, as are known, which will maintain an internal pressure of up to about 3 to 5 psig or so.

A further aspect of the present invention, where the conductive metal substrate used is other than the lead or lead alloy fiber or mesh composite, is to preferably mechanically or chemically abrade the lead or lead-alloy surface which will be pasted with active material. It has thus been found suitable to mechanically abrade the surface by passing the conductive metal substrate through a pair of knurled rollers. The resulting abraded conductive metal substrate has been found to have adequate paste adhesion characteristics, particularly when employed in conjunction with the preferred paste curing process.

The following Examples are intended to be illustrative and not in limitation of the present invention.

EXAMPLE 1

This Example shows the use of the present invention in making and testing a bipolar battery using a multi-layered metallic substrate.

The conductive metal substrate used for each of the plates was: 0.002" Pb/0.002" Ti/0.008" Cu/0.002" Pb. Six bipolar cells were assembled. The positive end plate used positive paste on the titanium side of the substrate, and the negative end plate had the negative paste on the copper side of the substrate. The size of the battery was 1.6"×1.6"×1", and the electrode surface area was 1.25"×1.25". The thickness of the positive material on the positive end plate and the positive side of each bipolar plate was 0.03", the weight of the positive material per plate was 3.32 gms., and the active material density was 4.32 gms./cm.$^3$. The thickness of the negative end plate and the negative side of each bipolar plate was 0.03" of active material, the weight of negative active material per plate was 3.09 gms., and the active material density was 4.02 gms./cm.$^3$.

The separators utilized were glass fiber mats having a porosity in the range of 90–95% and a thickness of 0.067" before compression and 0.06" after compression.

The sulfuric acid specific gravity for the electrolyte was 1.27, and 2.42 gms. of electrolyte were included per cell.

The curing procedure involved, after pasting, storing the plates at room temperature, loosely covered with a thin plastic film for seven days. Thereafter, the plates were cured at 122° F. for one day and were thereafter steam-cured at 230° F. for one hour. The plates were thereafter dried at room temperature.

Figure 5:
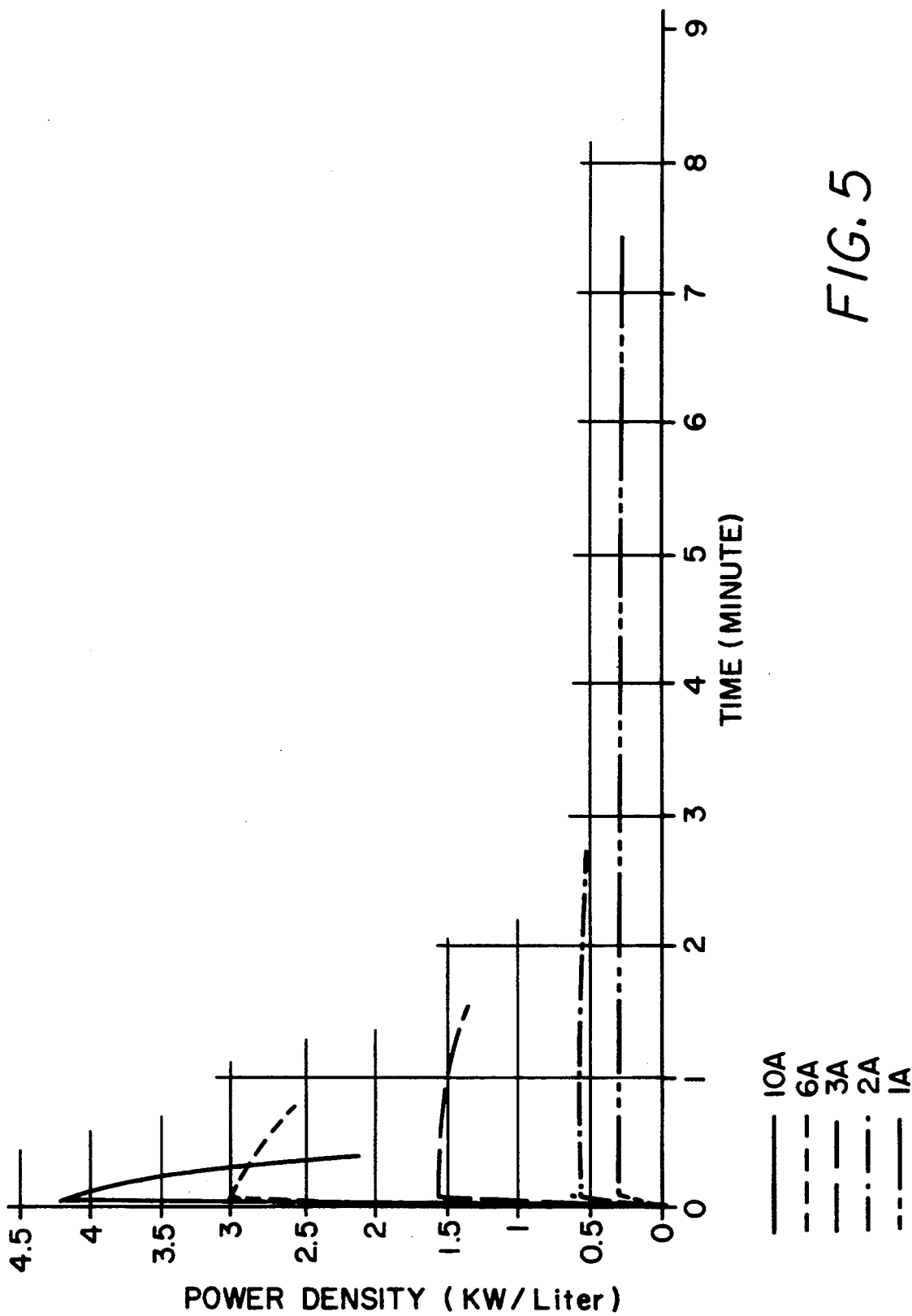
FIG. 5 is a graph of the power density versus time and showing test results for a bipolar battery of the present invention utilizing a novel conductive metal substrate at various rates of discharge.

After formation, the resulting battery was subjected to discharge at 78° F. at rates ranging from 1 amp to 10 amps. The power density under these discharge cycles are shown in FIG. 5. The results demonstrate the utility of the bipolar lead-acid battery tested.

EXAMPLE 2

This Example illustrates the use of the present invention in making and testing a laboratory prototype of a 12-volt valve-regulated bipolar lead-acid battery.

The configuration of the bipolar battery is as illustrated in FIG. 1. The overall dimensions of the battery were 11"×8"×1.75" and weighed about 26.5 pounds. The conductive metal substrate used was a lead sheet. To serve as the positive terminal and the end plates, each such plate comprised lead-plated copper in which the copper had a thickness of 0.03". The negative terminal comprised lead-plated copper in which the copper had a thickness of 0.063".

Two end plates, one central bi-negative plate and ten bipolar plates were utilized, each having an area of about 88 in.$^2$, the pure lead substrate having a thickness of 0.029". Each plate had about 60 square inches of both positive and negative active material paste, the active material being divided into three separate areas having gas channels between as shown in FIG. 3. About 103 gms. of positive active material paste were provided per plate to provide a thickness of 0.033". About 120 gms. of negative paste per plate was added to provide a thickness of 0.033", as well. The active material density of the positive paste was 3.6 gms./cm.$^3$, and the density of the negative active material was about 4.35 gms./cm.$^3$.

The separator used had a thickness prior to compression of about 0.035" of a commercially available polyester/glass mat separator used for conventional valve-regulated, sealed lead-acid batteries. Each separator had a weight of 0.099 grams per square inch and dimensions of 10.5"×6.5"×0.035". Valve regulation was achieved using rubber umbrella valves, commercially available for this purpose.

The electrolyte comprised sulfuric acid of 1.28 specific gravity. Eighty-five cubic centimeters of electrolyte were added per cell.

Figure 6:
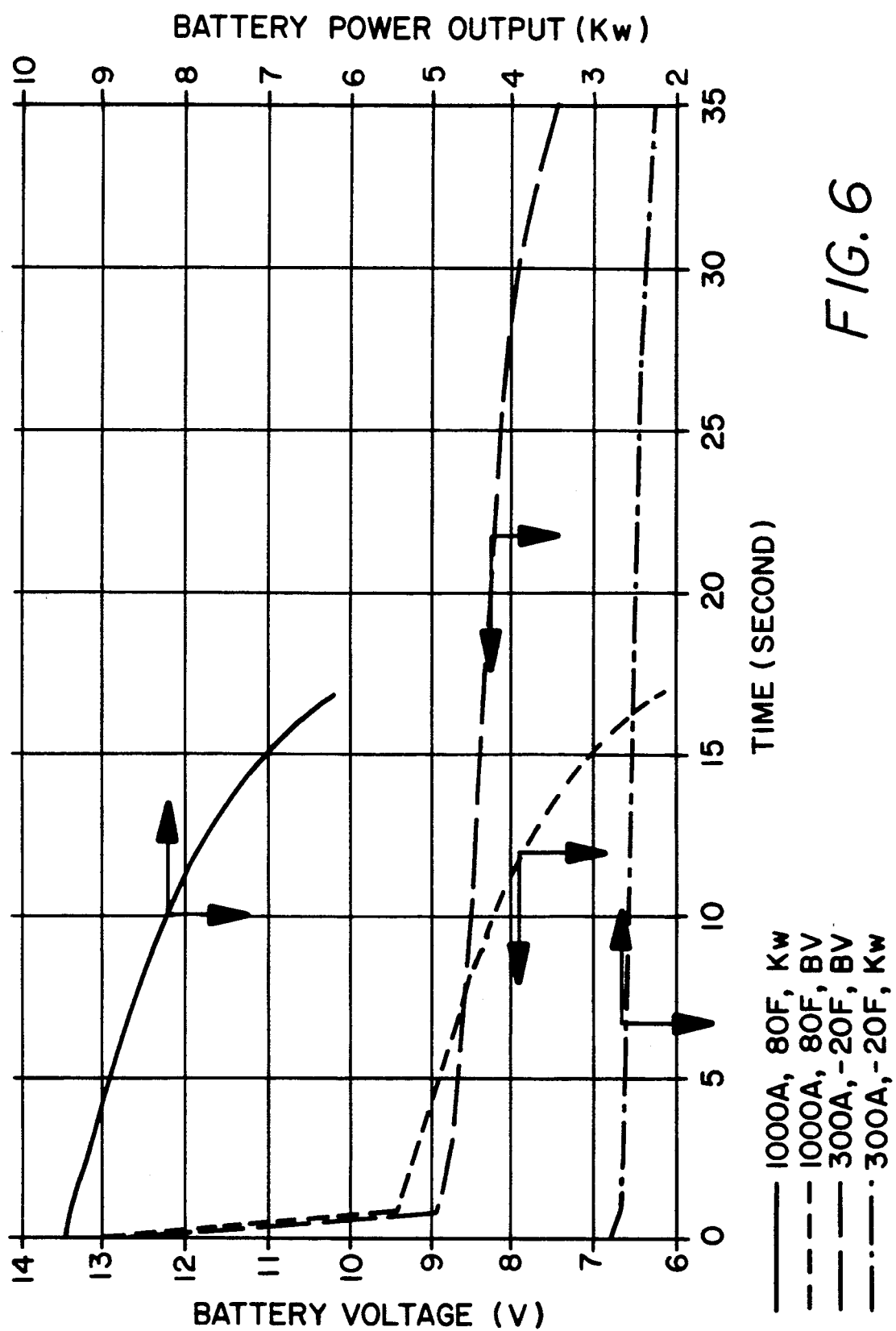
FIG. 6 is a graph of battery voltage and power output versus discharge time and showing test results of another embodiment of a bipolar battery of this invention at various rates of discharge at various temperatures.

The assembled battery was subjected to discharge at temperatures of −20° F. and 80° F. The discharge curves of the battery voltage and power output versus time are shown in FIG. 6. This Example is considered to show the viability of the battery of the present invention.

We claim:

1. A bipolar lead-acid battery having bipolar plates comprising a multi-layered metallic substrate defined as C/A/B/D, layer C having a layer of positive active material adhered thereto and layer D having a layer of negative material adhered thereto, C being a member selected from the group consisting of lead, a lead alloy and a conductive tin, titanium or ruthenium oxide, A being a member selected from the group consisting of titanium and tin, B being a member selected from the group consisting of copper and tin, and D being a member selected from the group consisting of lead, a lead alloy and tin.

2. The bipolar lead-acid battery of claim 1 wherein C is lead, A is titanium, B is copper and D is lead.

3. The bipolar lead-acid battery of claim 1 wherein said battery is a sealed battery.

4. The bipolar lead-acid battery of claim 1 wherein D is tin and layer B is omitted.

5. The bipolar lead-acid battery of claim 1 wherein C is a conductive film of a tin, titanium or ruthenium oxide doped with Sb or F.

6. A bipolar lead-acid battery having a desired voltage and capacity which comprises a set of end plates having a layer of positive or negative active material adhered thereto, a series of bipolar plates having a layer of positive active material adhered to one surface of said plates and a layer of negative active material adhered to the other surface and positioned between the set of end plates with the layer of active material of a polarity opposite to that of the active material adhered to the end plates facing said end plates and at least one central bi-plate being positioned between said bipolar plates and having a layer of active material on each surface opposite to that of the layer of active material on the end plates, the number of bipolar and central bi-plates being selected to provide the desired voltage and capacity for the battery, and a separator positioned between adjacent layers of active material of opposing polarity.

7. The bipolar lead-acid battery of claim 6 wherein said battery is a sealed bipolar lead-acid battery.

8. The bipolar lead-acid battery of claim 6 wherein said end, bipolar and central bi-plates each comprise a conductive metal substrate.

9. The bipolar lead-acid battery of claim 8 wherein the bipolar plates comprise a multi-layered metallic substrate defined as C/A/B/D, layer C having a layer of positive active material adhered thereto and layer D having a layer of negative active material adhered thereto, C being a member selected from the group consisting of lead, a lead alloy and conductive tin, titanium or ruthenium oxide, A being a member selected from the group consisting of titanium and tin, B being a member selected from the group consisting of copper and tin, and D being a member selected from the group consisting of lead, a lead alloy and tin.

10. The bipolar lead-acid battery of claim 8 wherein the bipolar plates comprise a conductive metal substrate-fiber or mesh composite, one surface having a layer of positive active material adhered thereto and having partially embedded therein a fiber or mesh selected from the group consisting of glass, titanium, tin dioxide-coated glass and copper.

11. A bipolar lead-acid battery having bipolar plates comprising a conductive metal substrate having on one surface a layer of negative active material and on the other surface having at least an outer layer and an inner layer of positive active material, the density of the outer layer being in the range of from about 3.5 to about 4.0 g cm$^3$, the inner layer of positive active material being adhered to one surface of the conductive metal substrate and having a density in the range of from about 4.3 to about 4.5 g/cm$^3$.

12. A bipolar lead-acid battery having bipolar plates comprising a plastic frame forming a peripheral border having a top and bottom surface and a central open area, a conductive metal substrate embedded in the plastic frame and covering the central open area, a layer of negative active material on one surface of the conductive metal substrate and a layer of positive active material on the other surface of the conductive metal substrate, each layer of active material being discontinuous and having a plurality of spaced channels running from adjacent the bottom surface of the peripheral border to the top surface.

13. The bipolar lead-acid battery of claim 10, wherein the composite comprises lead or a lead alloy.

* * * * *